Nov. 26, 1957   R. D. PITTS   2,814,068
POULTRY STUNNER
Filed Dec. 28, 1953   3 Sheets-Sheet 1
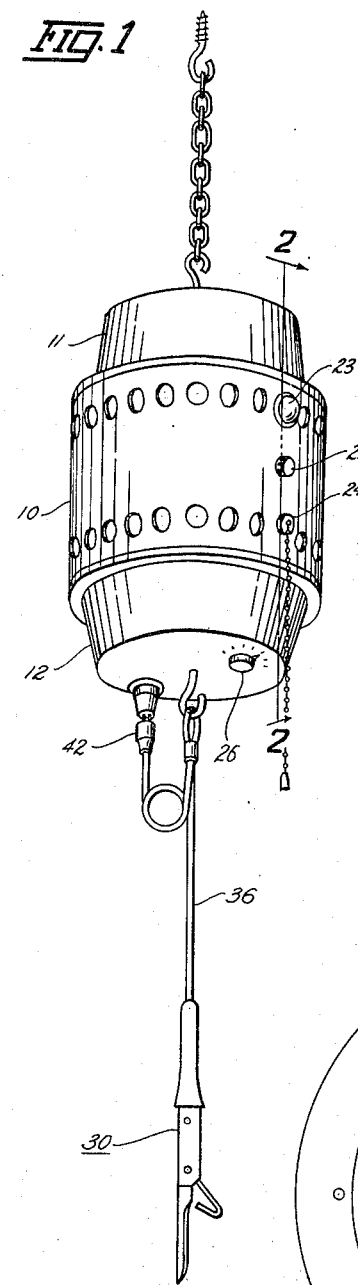
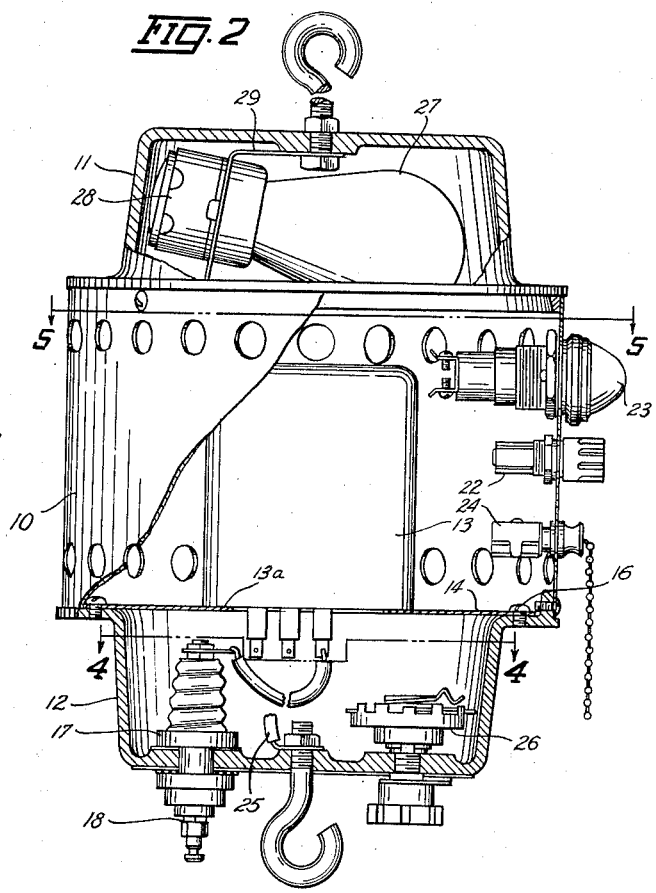
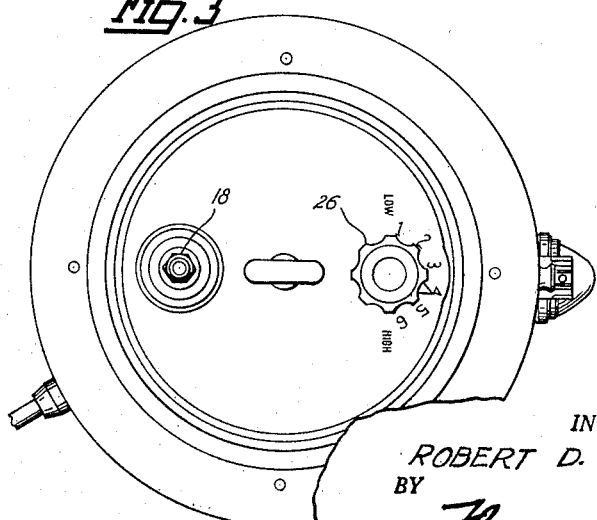
INVENTOR.
ROBERT D. PITTS
BY
Flournoy Corey
ATTORNEY.

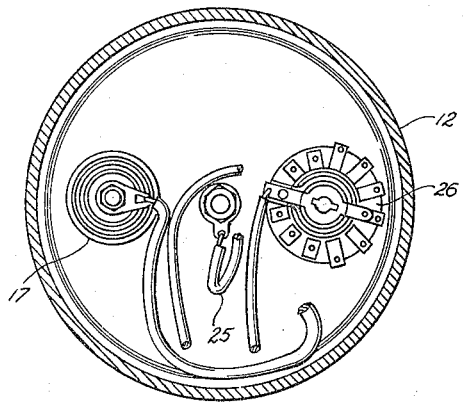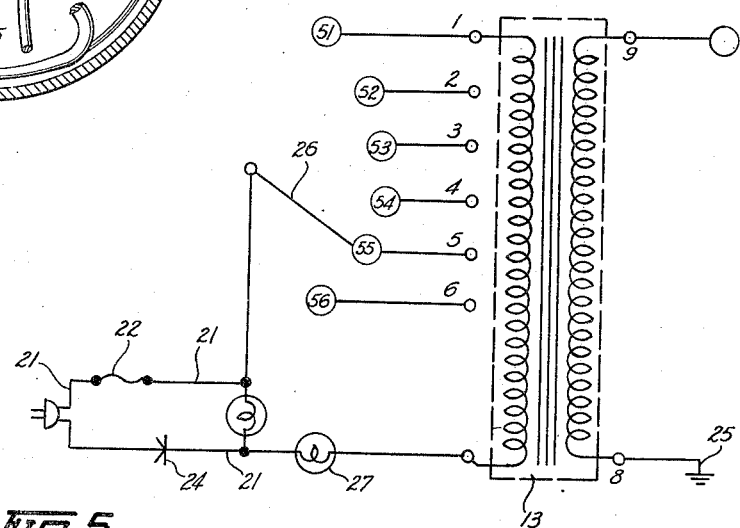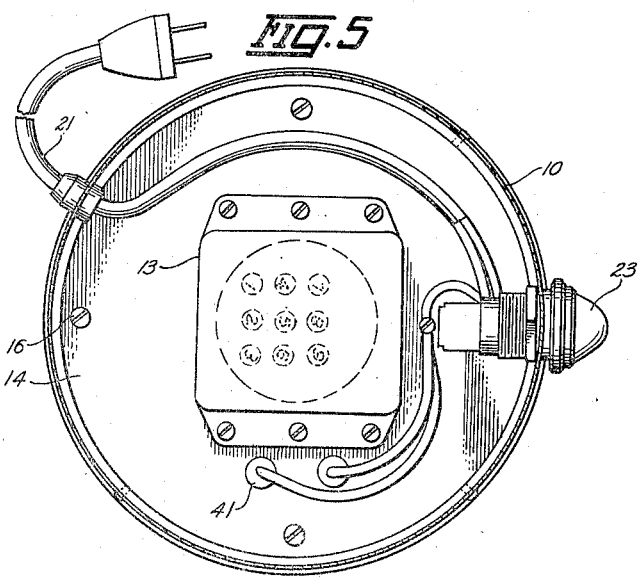

Nov. 26, 1957 R. D. PITTS 2,814,068
POULTRY STUNNER
Filed Dec. 28, 1953 3 Sheets-Sheet 3
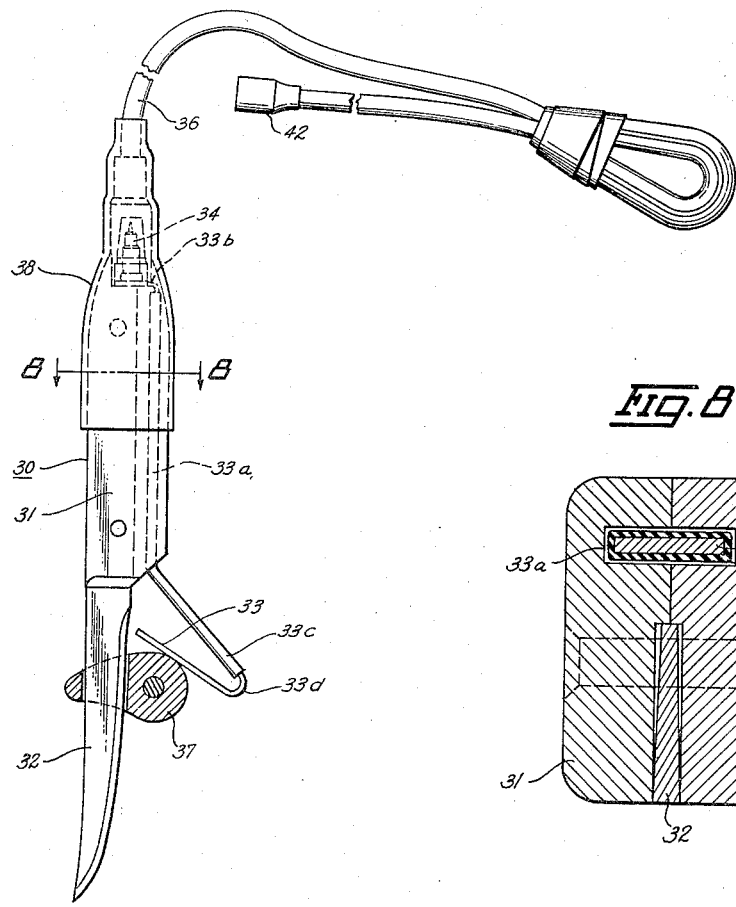
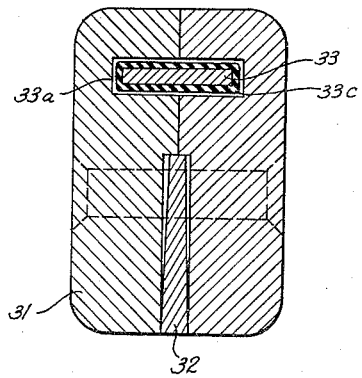
INVENTOR.
ROBERT D. PITTS
BY
Flournoy Corey
ATTORNEY.

United States Patent Office 2,814,068
Patented Nov. 26, 1957

2,814,068

POULTRY STUNNER

Robert D. Pitts, Cedar Rapids, Iowa, assignor to Pickwick Company, Cedar Rapids, Iowa, a corporation of Iowa Application December 28, 1953, Serial No. 400,721

1 Claim. (Cl. 17—11)

This invention relates to poultry processing equipment and has particular relation to a stunner for stunning the birds so that when they are cut or stuck for draining the blood from the bird, the bird may be stunned sufficiently to prevent it from threshing wildly about, but not enough to cause all movement to cease.

In the processing of poultry, the step of sticking or killing is a very important one and can determine the quality of the finished bird. Also, the process is a very messy one, blood usually being splattered about the killing area to such an extent as to affect sanitation in the plant.

Of late, stunning devices have been employed in an attempt to control the struggling of the bird and promote proper bleeding.

One of the major objections to stunners of the prior art is that the birds received such a continued shock that they were either killed or so heavily stunned that no further movement occurred. This prevented free draining of blood from the bird and in many cases the dressed bird was spoiled by reason of the fact that clotted blood remained in the veins.

Another marked result of improper stunning was that drainage of the bird took some considerable period of time and blood might still be draining from the bird even after the scalding operation. Furthermore, the bird did not relax and the tail and the heavy wing tip feathers of the bird were not loosened and the pulling of these feathers was a very difficult operation. These various disadvantages of the stunning operation so far known in the art have materially limited the use of stunners for the reasons that the birds did not have the proper appearance and did not keep well and the processing operation itself was rendered more difficult.

I have discovered that in order for a stunning operation to be successful, that is, so that the bird will not thresh wildly about, so that the bird will bleed thoroughly and quickly and so that the bird will relax to permit easy removal, particularly of its large tail and wing feathers, the following conditions must be met. It must be possible to provide an initial surge of power which is variable over a relatively wide range of voltage and this surge of power must be tapered off immediately to limit the stunning current. Furthermore, the length of time this lowered stunning voltage is applied to the bird must be under full control of the operator and must not be determined or limited by the time actually required by the operator to stick the bird.

It has been impossible to control all of these factors in any known devices of the prior art. It has been my observation that if the initial voltage is sufficiently high to stun the bird but is not tapered off, it is next to impossible to control the length of the stunning period. If the initial voltage is lowered, the bird will not be properly stunned. The results in either case are usually birds which are improperly bled, hard to de-feather and birds which thresh wildly about splattering blood over a wide area and bruising their flesh.

Therefore, an important object of the invention is to provide means to stun a bird without killing it and without making it rigid so that all movement ceases.

Another object of the invention is to provide a stunning unit in which the means for supplying the proper electric current may be suspended in such manner as to have a minimum of exposure to moisture.

Another object of the invention is to provide an attractive, easily manufactured unit which is simple and reliable in operation and servicing.

Another object of the invention is to provide a device in which the output voltage may be readily varied over a wide range and in which the first surge of power at high voltage will be immediately tapered off to relatively lower voltage and, at the same time, to provide means whereby the operator may carefully and completely control the period of time during which the actual stunning operation takes place.

Still another important object of the invention is the provision of a simple housing structure for a device of this nature which effectively seals and protects the high voltage elements of the device against moisture damage.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as wall within the scope of the appended claim, without a departing from the spirit of the invention.

In said drawings:

Figure 1 is a view in perspective of a device constructed in accordance with one embodiment of my invention showing the knife and electrode attached to the power source.

Figure 2 is an enlarged view, partly in elevation and partly in section, of the device shown in Figure 1 and illustrating the relation of the parts of the device.

Figure 3 is a bottom view of the device shown in Figures 1 and 2.

Figure 4 is a bottom view of the lower portion of the stunner taken along the line 4—4 of Figure 2.

Figure 5 is a view of the interior of the stunner power unit taken from above, along the line 5—5 of Figure 2.

Figure 6 is a circuit diagram of the electric circuit of the stunner.

Figure 7 is a view in elevation of the knife and electrode shown in Figure 1 with the interior structure of the handle of the device illustrated in dotted lines.

Figure 8 is an enlarged view in section of the handle of the knife taken along the line 8—8 of Figure 7.

Referring now to the drawings:

The device construction, according to a preferred embodiment of my invention, employs a drum-like center member such as 10, and upper and lower covers or housings, 11 and 12.

It has been found that voltages of the order of 700 volts are desirable for stunning turkeys, and 350 volts for stunning chickens. Of course, there are variations in voltages required as, for instance, a broiler as compared to a rooster. Therefore, it is desirable to be able to vary the voltage output of the power unit.

The transformer 13 employed for furnishing the current for stunning the bird is preferably a sealed unit having a plurality of taps thereon as illustrated in Figure 2 and this unit is mounted on a disk-like base 14 which is secured by screws 16 to the inner face of the lower housing 12. A lead-in insulator 17 extends through the wall of the lower housing 12 to conduct the high voltage current through the housing and the terminal of this insulator, illustrated at 18, is connected to a tap 9 on the high voltage side of the transformer 13 and the other tap 8 of the high voltage side of the transformer is grounded to the housing as at 25.

Sealing compound is applied between the lower surface 13a of the transformer and the adjoining face of the disk-like base plate 14 as well as between the adjoining surfaces of the disc 14 and the lower housing 12. Thus, the terminals of the transformer, as well as the switch contacts and the high voltage wiring, as hereinafter described, are totally enclosed and sealed against moisture.

The device preferably uses the usual 110-volt alternating household current and this 110-volt current is brought into the unit through the conductor 21. A fuse 22 is located in this circuit and a pilot lamp 23, mounted on the central drum of the housing, is connected across the line to indicate whether or not current is being furnished to the unit. A pull-chain switch 24 is also located in the central housing 10 and this switch controls the current entering the primary of the transformer.

An incandescent electric bulb 27 is connected in series with the primary winding of the transformer 13 and is mounted in the socket 28 which is in turn attached within the upper housing 11 by means of a bracket 29.

Rubber grommets 41 are provided where wiring passes through the disc or base 14 to prevent passage of moisture into the chamber formed by the lower housing 12.

A plurality of taps 51, 52, 53, 54, 55 and 56 are provided for the primary of the transformer and the switch 26 is employed to connect these various taps selectively to the 110-volt power source. Thus the voltage available across the secondary terminals of the transformer may be varied at will and over a wide range, preferably from a low of about 150 volts to a high of 1000 volts.

The so-called electric knife 30 includes an insulating handle 31 preferably in two parts for holding the blade 32. An electrode is provided in the form of a strap as illustrated at 33 and this strap passes through a slot in the handle of the knife as illustrated at 33a and is bent over at 33b so that a detachable or snap connector 34 may be employed within the base of the knife to make an electrical connection with the single conductor cord 36. The strap-like electrode 33 is provided with an insulating cover 33c for most of its length, but the electrode is bent back upon itself as illustrated at 33d so as to form an exposed flat strip for contacting the neck of the bird as illustrated at 37. The end of the handle is covered by a rubber sheath 38 which removes the strain from the detachable connector 34 and further insulates the handle. The cord 36 is connected to the high voltage terminal 18 by means of a snap connector 42.

The advantage of this knife structure is that the bird may be stunned at any desired point in the sticking operation, either during the operation or before or after the operation. No burning of the knife blade occurs because it is not energized. It is possible to stick and stun a bird in a single movement of the knife, as shown in Figure 7, although the operator retains complete control of the stunning period and is still not required to work overly fast in order to avoid over-stunning the bird. The knife may, of course, be used in a number of ways but when used as illustrated in Figure 7, the blade is inserted through the jugular vein of the bird until the electrode 33 contacts the side of the neck. The electrode itself is held in contact with the neck only until the bird starts to relax. The knife should be withdrawn a distance sufficient to break the electrical contact between the bird and the electrode and this should be done immediately when the bird starts to relax. From this point, the knife may be manipulated as desired since the blade itself is not charged.

As stated before, I have found that the initial, relatively high voltage should be applied to a bird for only a very short period of time—a few cycles—and that this initial voltage should be immediately reduced. There may be other ways of securing this result, but the easiest method I have found is to introduce an electric light filament in the primary circuit which supplies current to the primary of the transformer. The filament of an incandescent lamp has the characteristic of increasing its resistance when current is passed through it.

Therefore, by utilizing an electric light in the primary circuit, I permit a surge of the full voltage stunning circuit, but this voltage is quickly limited by heating of the filament. By utilizing this voltage modulating circuit, I find that the poultry is stunned sufficiently to prevent any wild or violent movement of the bird, thus preventing splashing of the blood and injury and destruction of the suspending track and the killing tunnels, but not sufficient to entirely limit movement of the bird. The bird will still move to a limited degree and thus, proper drainage is promoted.

Although I have described a specific embodiment of my invention, it is apparent that modifications thereof may be made by those skilled in the art. Such modifications may be made without departing from the spirit and scope of my invention as set forth in the appended claim.

I claim as my invention:

In a poultry stunning device including a stunning electrode, a cylindrical, ventilated housing, upper and lower, cupped end bells mounted on the housing in opposed relation, plate means, having a terminal opening therein, mounted within the housing at the bottom thereof to seal off a wiring space in the lower end bell, a sealed, tapped, step-up transformer having terminals extending through the bottom thereof and through the terminal opening in the said plate whereby the transformer may be mounted upon and sealed to the plate, an externally operable tap switch mounted within the lower end bell for selectively connecting the terminals of the transformer, an insulated electrode terminal passing through and sealed to the lower end bell, and an incandescent current control bulb mounted in the ventilated housing with the transformer to afford free ventilation for the bulb and transformer while sealing all terminal connections against moisture and condensation.

References Cited in the file of this patent

UNITED STATES PATENTS

| | | |
|---|---|---|
| 852,711 | Frank | May 7, 1907 |
| 1,752,873 | Zelt | Apr. 1, 1930 |
| 1,847,603 | Fischer | Mar. 1, 1932 |
| 1,870,093 | Boyajian et al. | Aug. 2, 1932 |
| 1,988,733 | Helgason | Jan. 22, 1935 |
| 2,536,220 | Rabin | Jan. 2, 1951 |
| 2,687,550 | Coleman | Aug. 31, 1954 |